US012083756B2

(12) United States Patent
Schwab et al.

(10) Patent No.: US 12,083,756 B2
(45) Date of Patent: Sep. 10, 2024

(54) METHOD FOR PROVIDING A MALE MOLD HALF FOR MOLDING A TORIC OPHTHALMIC LENS AT A PREDETERMINED TARGET ROTATIONAL ORIENTATION

(71) Applicant: ALCON INC., Fribourg (CH)

(72) Inventors: Matthias Schwab, Amorbach (DE);
Udo Schuessler, Hoesbach (DE);
Steffen Lieb, Moemlingen (DE);
Eduard Jetzlaff, Schollbrunn (DE);
Jan Bernard, Niedernberg (DE);
Halina Heidrich, Kahl am Main (DE);
Thomas Tonn, Aschaffenburg (DE)

(73) Assignee: Alcon Inc., Fribourg (CH)

( * ) Notice: Subject to any disclaimer, the term of this patent is extended or adjusted under 35 U.S.C. 154(b) by 110 days.

(21) Appl. No.: 17/398,280

(22) Filed: Aug. 10, 2021

(65) Prior Publication Data

US 2022/0048261 A1 Feb. 17, 2022

Related U.S. Application Data

(60) Provisional application No. 63/063,990, filed on Aug. 11, 2020.

(51) Int. Cl.
*B29D 11/00* (2006.01)
*B25J 15/00* (2006.01)
(Continued)

(52) U.S. Cl.
CPC ..... *B29D 11/00538* (2013.01); *B25J 15/0047* (2013.01); *B25J 15/0616* (2013.01);
(Continued)

(58) Field of Classification Search
CPC .. B25J 15/009; B25J 15/0042; B25J 15/0038; B25J 15/0047; B25J 15/0616;
(Continued)

(56) References Cited

U.S. PATENT DOCUMENTS 5,916,494 A 6/1999 Widman
6,197,227 B1 3/2001 Appleton et al.
(Continued)

FOREIGN PATENT DOCUMENTS

KR 20160004031 A * 1/2016
WO 2010115857 A1 10/2010

OTHER PUBLICATIONS

Translation of KR-20160004031-A (Year: 2016).*

*Primary Examiner* — John J DeRusso
(74) *Attorney, Agent, or Firm* — Sheng-Hsin Hu (57) ABSTRACT

A method of providing a male mold half for molding a toric contact lens at a predetermined target rotational orientation is disclosed. The method comprises the steps of: —providing the male mold half at a predetermined rotational orientation, —picking the male mold half up with a gripper having a central axis, —rotating the gripper with the male mold half about the central axis of the gripper by a predetermined rotational angle (α) towards the predetermined target rotational orientation, and —releasing the rotated male mold half from the gripper. Prior to picking the male mold half up, the method comprises centering the grippe and the male mold half relative to each other such that the central axis of the gripper and a central axis of the male mold half coincide.

5 Claims, 5 Drawing Sheets

(51) Int. Cl.
  *B25J 15/06* (2006.01)
  *B29C 31/00* (2006.01)
  *B29C 33/30* (2006.01)
  *B29L 11/00* (2006.01)

(52) U.S. Cl.
  CPC .......... *B29C 31/006* (2013.01); *B29C 33/303* (2013.01); *B29D 11/00019* (2013.01); *B29D 11/00173* (2013.01); *B29D 11/0023* (2013.01); *B29D 11/00509* (2013.01); *B29D 11/00528* (2013.01); *B29L 2011/0016* (2013.01); *B29L 2011/0025* (2013.01); *B29L 2011/0041* (2013.01)

(58) Field of Classification Search
  CPC ... B29C 33/303; B29C 33/304; B29C 31/006; B29D 11/00538; B29D 11/00173; B29D 11/00019; B29D 11/00509; B29L 2011/0025; B29L 2011/0016; B29L 2011/0041
  See application file for complete search history.

(56) References Cited

U.S. PATENT DOCUMENTS

| | | | |
|---|---|---|---|
| 2007/0212438 A1 | 9/2007 | Saeki et al. | |
| 2010/0258962 A1 | 10/2010 | Doerr | |
| 2014/0008824 A1* | 1/2014 | Niu | B29D 11/005 425/346 |
| 2014/0373337 A1* | 12/2014 | Iwasaki | B23P 19/10 29/559 |
| 2016/0176072 A1* | 6/2016 | Gibson | B29C 33/0038 425/468 |
| 2018/0170688 A1* | 6/2018 | Kikuchi | B65G 47/90 |

\* cited by examiner

METHOD FOR PROVIDING A MALE MOLD HALF FOR MOLDING A TORIC OPHTHALMIC LENS AT A PREDETERMINED TARGET ROTATIONAL ORIENTATION

BACKGROUND

The invention relates to the field of manufacture of toric ophthalmic lenses, in particular toric contact lenses such as toric soft contact lenses. More specifically, the invention relates to a method of providing a male mold half for molding a toric ophthalmic lens at a predetermined target rotational orientation, and to a method of mating a male mold half for molding a toric ophthalmic lens with a female mold half to form a closed lens mold for molding a toric ophthalmic lens.

Toric ophthalmic lenses such as toric contact lenses, in particular toric soft contact lenses, are used to correct astigmatism of an eye. In general, the cylindrical correction required for correcting the astigmatism (i.e. the correction adding to a potential spherical correction required) can generally be provided either by a toric portion on the front surface or on the rear surface of a toric contact lens (arranged in an optical portion of the toric contact lens), or by toric portions arranged on both surfaces. For a number of reasons, in many toric contact lenses the toric portion is provided on the rear surface of the toric contact lens while at the same time the front surface as a whole is a non-rotationally symmetric surface (which may be non-toric or may be toric as well) which has a geometrical shape such that the toric contact lens has features (e.g. prism ballast or slab-off) arranged in a non-optical portion of the toric contact lens that help stabilizing the contact lens on the eye in the predetermined rotational orientation required for properly correcting the astigmatism.

Toric contact lenses—like most contact lenses—may be effectively manufactured in a lens molding process. A lens mold used in such lens molding process typically comprises a male mold half determining the geometrical shape of the rear surface of the contact lens, and a female mold half determining the front surface of the contact lens.

By way of example and for the purpose of simplifying the following discussion, in the following a contact lens is discussed in which the toric portion is provided on the rear surface of the toric contact lens while at the same time prism ballast is provided by the geometrical shape of the front surface.

As mentioned already, a toric contact lens must have a predetermined rotational orientation in its stabilized position on the eye in order to properly correct the astigmatism. However, the axis of the principal meridian of the astigmatism of the eye may not necessarily run in the horizontal direction, and in many instances it actually does not run horizontally but instead the principal meridian of the astigmatic eye includes an angle with the horizontal. The other meridian of the astigmatism of the eye typically runs perpendicular to the principal meridian (although this is not necessarily so).

Consequently, in order to correct the astigmatism of the eye the major axis of the toric portion provided on the rear surface of the toric contact lens must include the same angle relative to the horizontal that is included by the principal meridian of the astigmatism and the horizontal when the toric contact lens is in its stabilized position on the eye. This holds similarly for the minor axis of the toric surface portion which must include the same angle with the horizontal that is included between the other meridian of the astigmatism and the horizontal.

In terms of the male mold half and female mold half determining the geometrical shape of the rear surface and of the front surface of the toric contact lens, respectively, this means that upon mating the male and female mold halves (with the lens-forming material having been introduced into the female mold half prior to mating the male and female mold halves) these must be arranged relative to one another such that the prism ballast and the major and minor axes of the toric portion must be arranged at the correct angular orientations relative to one another. Since the principal meridian of the astigmatism - depending on the patient - may occur at different angles relative to the horizontal, to correct astigmatism having a principal meridian which includes a specific angle with the horizontal the major axis of the toric portion of the male mold half must have a target rotational orientation relative to a predetermined rotational orientation of the female mold half that corresponds to the respective specific angle included by the principal meridian and the horizontal. The predetermined rotational orientation of the female mold half is such that the prism ballast is positioned at the lowermost portion of the toric contact lens when the toric contact lens is in its stabilized portion on the eye. Accordingly, in the stabilized position the major and minor axes of the toric portion coincide with the principal meridian and the other meridian of the astigmatism of the eye.

This means that at the time of mating the male and female mold halves to form the lens mold (typically the male mold half is placed on the female mold half into which the lens-forming material has been introduced) the male mold half must have the required target rotational orientation relative to the predetermined rotational orientation of the female mold half. In the manufacture of toric contact lenses, this is typically achieved by rotating the male mold half to the desired target rotational orientation and placing it on the female mold half having the predetermined rotational orientation.

Both the male and female mold halves are typically provided at an initial predetermined rotational orientation in the manufacturing process. Since the crucial aspect is the target rotational orientation of the male mold half relative to the predetermined rotational orientation of the female mold half at the time of mating the male and female mold halves, the male mold half is rotated from the initial predetermined orientation to the desired target rotational orientation, and is placed on the female mold half during mating the mold halves while maintaining the predetermined orientation of the female mold half and the target rotational orientation of the male mold half.

Especially in manufacturing processes in which the lens molds are plastic lens molds (e.g. polypropylene lens molds) which are used only once and which are recycled after a contact lens has been molded, each male mold must be rotated from the (initial) predetermined rotational orientation to the (desired) target rotational orientation. This is typically performed with the aid of a gripper picking the male mold half up at the rear surface of the male mold half and rotating the gripper with the male mold half by an angle corresponding to the angular difference between the (initial) predetermined rotational orientation and the (desired) target rotational orientation. In order to ensure that the gripper reliably picks the male mold half up at the rear surface thereof, the clearance between the (typically cylindrical) circumferential inner surface of the sidewall on the rear surface of the male mold half and the (typically cylindrical)

circumferential outer surface of the gripper is selected such that the gripper may safely be introduced in the space circumscribed by the circumferential inner surface of the sidewall without colliding with the sidewall. Once introduced, the male mold half can be reliably picked up by the gripper with the aid of suction.

Unfortunately, however, this clearance may result in that the male mold half is picked up by the gripper in a manner such that the central axis of the male mold half and the central axis of the gripper are offset relative to one another, i.e. the male mold is slightly decentered on the gripper. When the gripper with the male mold half is subsequently rotated about the central axis of the gripper by the said angle corresponding to the angular difference between the (initial) predetermined rotational orientation and the (desired) target rotational orientation, due to being decentered on the gripper the male mold half is not exactly arranged at the (desired) target rotational orientation after rotation, but rather the actual rotational orientation of the male mold after rotation deviates from the (desired) target rotational orientation.

Consequently, when the thus rotated male mold half having a rotational orientation that deviates from the (desired) target rotational orientation is mated with the female mold half having the predetermined rotational orientation, the toric portion of the rear surface of the toric contact lens molded with this mold does not have the exact rotational orientation to properly correct the astigmatism when the toric contact lens is in its stabilized position on the eye. This may repeatedly occur when single-use plastic molds are used in the lens manufacturing process and may therefore have a significant impact on the yield.

It is therefore an object of the invention to overcome the afore-discussed disadvantages of the prior art.

SUMMARY

In accordance with a first aspect of the invention, this object is achieved through a method of providing a male mold half for molding a toric ophthalmic lens, as specified in independent claim 1. Further advantageous aspects of this method are the subject of the respective dependent claims.

In accordance with a second aspect of the invention, this object is achieved through a method of mating a male mold half comprising a toric convex lens-forming surface with a female mold half comprising a non-rotationally symmetric concave lens-forming surface, as specified in independent claim 6. Further advantageous aspects of this method are the subject of the respective dependent claims.

The first aspect of the invention relates to a method of providing a male mold half for molding a toric ophthalmic lens, in particular a toric contact lens such as toric soft contact lens, at a predetermined target rotational orientation. The male mold half includes a front face having a toric convex lens-forming surface and a rear face opposite to the front face. The method includes the steps of:

providing the male mold half at a predetermined rotational orientation, picking the male mold half up with a gripper having a central axis, rotating the gripper with the male mold half about the central axis of the gripper by a predetermined rotational angle towards the predetermined target rotational orientation, the predetermined rotational angle being the angular difference between the predetermined rotational orientation and the predetermined target rotational orientation, and releasing the rotated male mold half from the gripper, wherein prior to picking the male mold half up, centering the gripper and the male mold half relative to each other such that the central axis of the gripper and a central axis of the male mold half coincide.

In accordance with a further aspect of the method according to the first aspect of the invention, centering the gripper and the male mold half relative to each other may be performed by engaging a centering surface portion of the gripper with a centering surface portion provided on the male mold half.

In accordance with a further aspect of the method according to the first aspect of the invention, the centering surface portion of the gripper may be a conical portion, for example a chamfer, tapering towards a distal end face of the gripper.

In accordance with still a further aspect of the method according to the first aspect of the invention, the rear face of the male mold half may include a cylindrical portion extending in a direction coaxial with the central axis of the male mold half and forming the centering surface portion thereof. In accordance with this aspect, the method may further include the step of introducing the gripper into the cylindrical portion on the rear face of the male mold half until the conical portion of the gripper engages the cylindrical portion on the rear face of the male mold half thereby causing centration of the gripper and the male mold half relative to each other.

In accordance with yet a further aspect of the method according to the first aspect of the invention, the rear face of the male mold half may further include an annular surface adjoining the cylindrical portion at a distal end of the cylindrical portion. The annular surface may extend radially inwardly in a plane perpendicular to the central axis of the male mold half and may have at least one pair of projections arranged thereon. The projections of each pair of the at least one pair of projections may be arranged angularly spaced from one another by 180 degrees in the plane perpendicular to the central axis of the male mold half.

In accordance with this aspect, the distal end face of the gripper may extend in a plane perpendicular to the central axis of the gripper, and the distal end face may comprise at least one pair of recesses arranged therein. The recesses of each pair of the at least one pair of recesses may be arranged angularly spaced from one another by 180 degrees in the plane perpendicular to the central axis of the gripper.

Still in accordance with this aspect the method may further include the step of introducing the gripper into the cylindrical portion of the rear face of the male mold half until the recesses of the at least one pair of recesses arranged in the distal end face of the gripper engage with the projections of the at least one pair of projections arranged on the annular surface of the rear face of the male mold half to rotationally lock the male mold half and the gripper.

The second aspect of the invention relates to a method of mating a male mold half comprising a toric convex lens-forming surface with a female mold half comprising a non-rotationally symmetric concave lens-forming surface, to form a closed lens mold for molding a toric ophthalmic lens, in particular a toric contact lens such as a soft toric contact lens. The method includes the steps of:

providing the female mold half at a predetermined rotational orientation and providing the male mold half at a target rotational orientation relative to the predetermined rotational orientation of the female mold half using the method according to the first aspect of the invention described above, picking the male mold half having the target rotational orientation up with a capping stamp having a central axis, and placing the male mold half on the female mold half to mate the male and female mold halves while keeping the target rotational orientation of the male mold half relative to the predetermined rotational orientation of the female mold half to form the closed lens mold, wherein the method further includes the step of prior to picking the male mold half up, centering the capping stamp and the male mold half relative to each other such that the central axis of the capping stamp and a central axis of the male mold half coincide.

In accordance with a further aspect of the method according to the second aspect of the invention, centering the capping stamp and the male mold half relative to each other may be performed by engaging a centering surface portion of the capping stamp with a centering surface portion provided on the male mold half.

In accordance with a further aspect of the method according to the second aspect of the invention, the centering surface portion of the capping stamp may be a conical portion, for example a chamfer, tapering towards a distal end face of the capping stamp.

In accordance with still a further aspect of the method according to the second aspect of the invention, the rear face of the male mold half may include a cylindrical portion extending in a direction coaxial with the central axis of the male mold half and forming the centering surface portion thereof. In accordance with this aspect, the method may further comprise the step of introducing the capping stamp into the cylindrical portion on the rear face of the male mold half until the conical portion at the distal end of the capping stamp engages the cylindrical portion on the rear face of the male mold half thereby causing centration of the capping stamp and the male mold half relative to each other.

In accordance with yet a further aspect of the method according to the second aspect of the invention, the rear face of the male mold half may further include an annular surface adjoining the cylindrical portion at a distal end of the cylindrical portion, the annular surface extending radially inwardly in a plane perpendicular to the central axis of the male mold half and having at least one pair of projections arranged thereon. The projections of each pair of the at least one pair of projections may be angularly spaced from one another by 180 degrees in the plane perpendicular to the central axis of the male mold half.

In accordance with this aspect, the distal end face of the capping stamp may include at least one pair of recesses arranged therein, and the recesses of each pair of the at least one pair of recesses may be spaced from one another by 180 degrees in the plane perpendicular to the central axis of the capping stamp. Still in accordance with this aspect, the method may further include the step of introducing the capping stamp into the cylindrical portion of the rear face of the male mold half until the recesses of the at least one pair of recesses arranged in the distal end face of the capping stamp engage with the projections of the at least one pair of projections arranged on the annular surface of the rear face of the male mold half to rotationally lock the male mold half and the capping stamp.

The invention provides for a number of advantages. As regards the method in accordance with the first aspect, the gripper always picks the male mold half up in a manner such that the male mold half is centered on the gripper, that is to say in a manner such that the central axis of the male mold half and the central axis of the gripper coincide. As a consequence of this centered arrangement of the male mod half on the gripper, rotation of the gripper (with the male mold half arranged thereon) about the central axis of the gripper by the predetermined rotational angle results in the male mold half being rotated exactly to the (desired) target rotational orientation. Any deviation from the desired target rotational orientation due to an off-center arrangement of the male mold half on the gripper is avoided. Accordingly, the thus rotated male mold half—which is later used when the lens mold is closed by mating the male and female mold halves - is provided at the exact target rotational orientation relative to the predetermined orientation of the female mold half, so that the molded toric ophthalmic lens is rotationally stabilized on the eye of the patient exactly at the desired rotational orientation to properly correct the astigmatism. In general, it is possible to pick the male mold half up at the front face or at the rear face. Since the front face of the male mold half typically includes the toric convex lens-forming surface (but in addition includes a peripheral surface surrounding the lens-forming surface that may be used for the picking up of the male mold half by the gripper), it is preferred to pick up the male mold half at the rear face, as will be described in more detail below.

Advantageously, the centered arrangement of the male mold half on the gripper (with the central axes coinciding) may be achieved with the aid of a centering surface portion, e.g. a conical portion such as a chamfer, tapering towards the distal end face of the gripper on one hand, and with the aid of a centering surface portion provided on the male mold half on the other hand. The centered arrangement (coincidence of the central axes) of the male mold half on the gripper can thus be achieved in a simple and reliable manner both from a constructional point of view as well as from a procedural point of view.

As regards the centering surface portion of the male mold half, this portion may be embodied as a cylindrical portion which is provided on the rear face of the male mold half. This cylindrical portion on the rear face of the male mold half may extend in a direction coaxial with the central axis of the male mold half. The conical portion of the gripper may be introduced into this cylindrical portion on the rear face of the male mold half until the conical portion of the gripper engages the cylindrical portion on the rear face of the male mold half, whereby the desired centered arrangement of the male mold half on the gripper (central axes coinciding) is reliably achieved.

Yet further, the rear face of the male mold half may comprise an annular surface adjoining the cylindrical portion at the distal end of the cylindrical portion. This annular surface extends radially inwardly in a plane perpendicular to the central axis of the male mold half. One or more pairs of projections may be arranged on this annular surface, with the two projections of each pair of projections being arranged angularly spaced from each other by 180 degrees in the plane perpendicular to the central axis of the male mold half. Correspondingly, the distal end face of the gripper may also extend in a plane perpendicular to the central axis of the gripper, and one or more pairs of recesses may be arranged in the distal end face of the gripper, with the two recesses of each pair of recesses being arranged angularly spaced from each other by 180 degrees in the plane perpendicular to the central axis of the gripper. Upon introducing the gripper into the cylindrical portion on the rear face of the male mold half, the recesses arranged in the distal end face of the gripper engage with the projections arranged on the annular surface on the rear surface of the male mold half. After engagement, the male mold half and the gripper are rotationally locked (so that no rotation of the male mold half relative to the gripper is possible anymore).

While the number of pairs of projections arranged on the annular surface of the rear face of the male mold half may exactly correspond to the number of pairs of recesses arranged in the distal end face of the gripper (in this case the angular positions of the pairs of projections must to correspond to the angular positions of the recesses arranged in the distal end face of the gripper), the number of pairs of projections may be lower than the number of recesses. For example, only one pair of projections may be arranged on the annular surface while one or more pairs of recesses may be arranged in the distal end face of the gripper. In one embodiment, only one pair of projections is provided on the annular surface of the rear face of the male mold half at angular positions that correspond to the direction of flow of the polypropylene during injection molding of the male mold half.

As regards the second aspect of the invention, the male mold half is already provided at the (desired) target rotational orientation relative to the predetermined orientation at which the female mold half is provided, and for this purpose the afore-described method of providing the male mold half at the said target rotational orientation is used. In order to be able to manufacture toric ophthalmic lenses in a manner such that these lenses are rotationally stabilized on the eye at the correct rotational orientation to properly compensate for the astigmatism, it is vital to close the lens mold by mating the male mold half provided at the target rotational orientation with the female mold half provided at the predetermined rotational orientation while exactly keeping the respective rotational orientations of the male and female mold halves. For this purpose the male mold half having the target rotational orientation is picked up by a capping stamp in a manner centering the gripper and the capping stamp relative to each other such that the central axis of the male mold half and the central axis of the capping stamp coincide. Thereafter, the male mold half is placed on the female mold half.

Advantageously, the centered arrangement of the male mold half on the capping stamp (with the central axes of the male mold half and of the capping stamp coinciding) may be achieved with the aid of a centering surface portion, e.g. a conical portion such as a chamfer, tapering towards the distal end face of the capping stamp on one hand, and with the aid of a centering surface portion provided on the male mold half on the other hand. The centered arrangement (coincidence of the central axes) of the male mold half and of the capping stamp can thus be achieved in a simple and reliable manner both from a constructional point of view as well as from a procedural point of view.

As regards the centering surface portion of the male mold half, this portion may be embodied as a cylindrical portion which is provided on the rear face of the male mold half. This cylindrical portion on the rear face of the male mold half may extend in a direction coaxial with the central axis of the male mold half. The conical portion of the capping stamp may be introduced into this cylindrical portion on the rear face of the male mold half until the conical portion of the capping stamp engages the cylindrical portion on the rear face of the male mold half, whereby the desired centered arrangement of the male mold half on the capping stamp (central axes coinciding) is reliably achieved.

Yet further, the rear face of the male mold half may comprise an annular surface adjoining the cylindrical portion at the distal end of the cylindrical portion. This annular surface extends radially inwardly in a plane perpendicular to the central axis of the male mold half. One or more pairs of projections may be arranged on this annular surface, with the two projections of each pair of projections being arranged angularly spaced from each other by 180 degrees in the plane perpendicular to the central axis of the male mold half. Correspondingly, the distal end face of the capping stamp may also extend in a plane perpendicular to the central axis of the gripper, and one or more pairs of recesses may be arranged in the distal end face of the capping stamp, with the two recesses of each pair of recesses being arranged angularly spaced from each other by 180 degrees in the plane perpendicular to the central axis of the capping stamp. Upon introducing the capping stamp into the cylindrical portion on the rear face of the male mold half, the recesses arranged in the distal end face of the capping stamp engage with the projections arranged on the annular surface on the rear surface of the male mold half. After engagement, the male mold half and the capping stamp are rotationally locked (so that no rotation of the male mold half relative to the gripper is possible anymore).

While the number of pairs of projections arranged on the annular surface of the rear face of the male mold half may exactly correspond to the number of pairs of recesses arranged in the distal end face of the capping stamp (in this case the angular positions of the pairs of projections must to correspond to the angular positions of the recesses arranged in the distal end face of the capping stamp), the number of pairs of projections may be lower than the number of recesses. For example, only one pair of projections may be arranged on the annular surface while one or more pairs of recesses may be arranged in the distal end face of the capping stamp. In one embodiment, only one pair of projections is provided on the annular surface of the rear face of the male mold half at angular positions that correspond to the direction of flow of the polypropylene during injection molding of the male mold half.

BRIEF DESCRIPTION OF THE DRAWINGS

Further advantageous aspects will become apparent from the following detailed description of embodiments of the invention with the aid of the drawings, in which.

DETAILED DESCRIPTION OF EMBODIMENTS

In FIG. 1-FIG. 4 an embodiment of a male mold half 1 for molding a toric contact lens is shown. Male mold half 1 comprises a front face 10 and a rear face 11 opposite to the front face 10. In the embodiment, the convex lens-forming surface 100 of the front face 10 of male mold half 1 has a toric shape having a major axis and a minor axis running perpendicular thereto. Male mold half 1 further comprises a tab 12. For the sake of simplicity, let us assume that the major axis of the toric convex lens-forming surface 100 runs in the direction of the tab 12 and that the minor axis runs perpendicular thereto, although this is not mandatory.

On the rear face 11, male mold half 1 comprises four conical pins 111 extending upwardly from an uppermost surface 110 of rear face 11. The conical pins 111 are provided on the uppermost surface 110 for manufacturing reasons only and are not essential for the invention. In the embodiment, rear face 11 of male mold half 1 comprises a cylindrical portion 112 extending downwardly from uppermost surface 110. Male mold half 1 comprises a central axis 113, and cylindrical portion 112 extends in a direction coaxial with central axis 113 of male mold half 1. Cylindrical portion 112 acts as a centering surface portion for centering a tool to be introduced into cylindrical portion 112, as will be explained in more detail below.

At the distal end (lower end) of cylindrical portion 112, the rear face 11 comprises an annular surface 114 adjoining cylindrical portion. Annular surface 114 extends radially inwardly in a plane perpendicular (i.e. normal) to central axis 113. As can be seen best in FIG. 3, a pair of projections 115 are arranged on annular surface 114. The individual projections 115 of the pair are angularly spaced from one another by 180° (degrees) in the plane perpendicular to central axis 113. While only one pair of projections 115 is shown in the embodiment, more than one pair may be provided, with the projections of each pair being angularly spaced from one another by 180° (like projections 115). In the embodiment shown, the projections 115 of the pair are arranged such that a straight line connecting the individual projections 115 coincides with a direction in which the tab 12 extends. This may be advantageous from a point of view of manufacturing the male mold half through injection-molding. Also, in the embodiment shown both the projections 115 as well as the tab 12 indicate the direction of the major axis of the toric convex lens-forming surface 100 (although this is only by way of example).

Figures 12, 13, 14, 15:
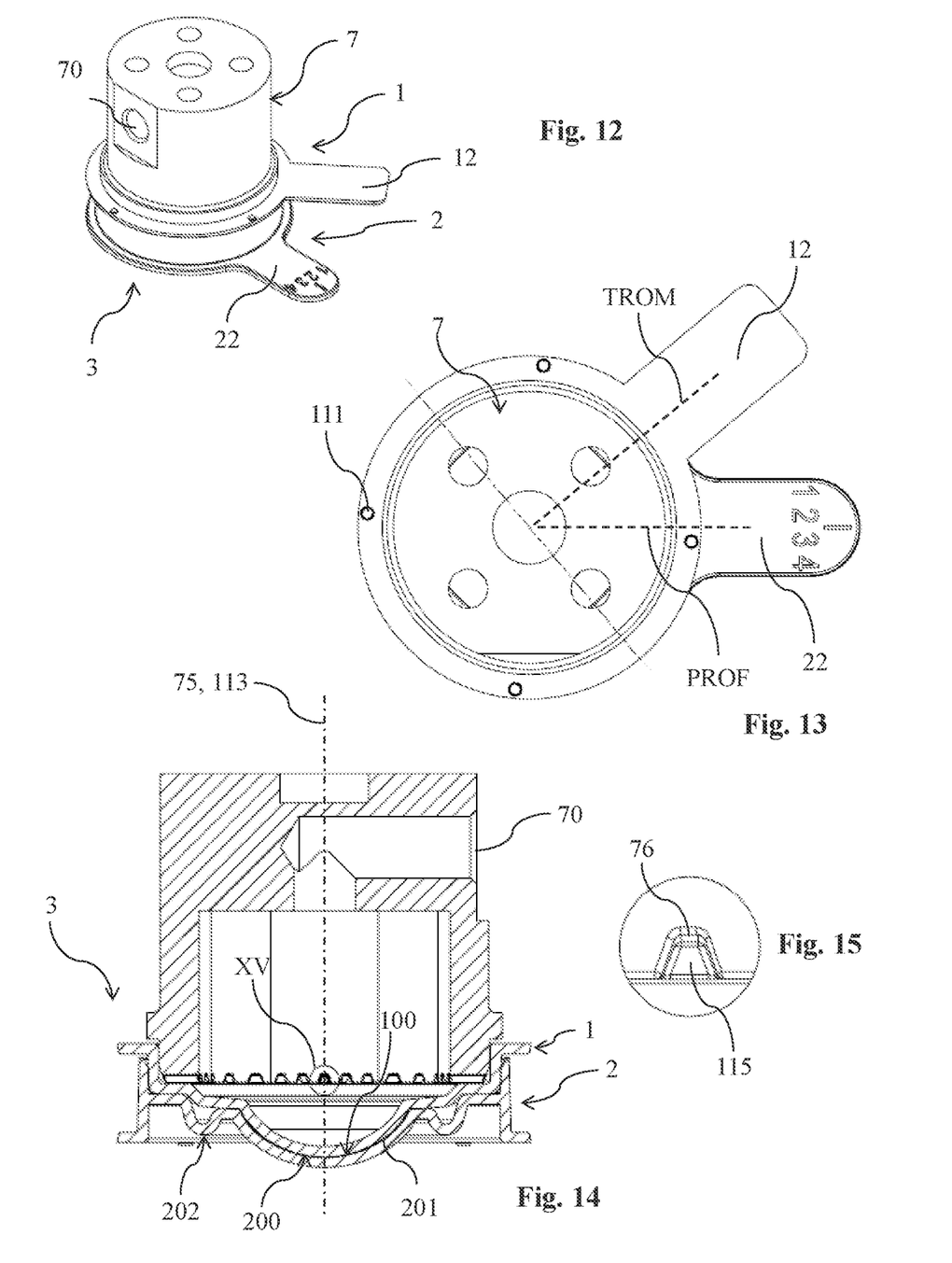
FIG. 12 is a perspective view the capping stamp of FIG. 10 during mating the rotated male mold half with the corresponding female mold half.
FIG. 13 is a top view of the capping stamp of FIG. 10 during mating the rotated male mold half with the corresponding female mold half.
FIG. 14 is a cross-sectional view of the capping stamp of FIG. 10 during mating the rotated male mold half with the corresponding female mold half.
FIG. 15 is an enlarged view of a detail of FIG. 14 showing the engagement of one of the recesses provided in the distal end face of the capping stamp with one of the projections provided on the rear face of the male mold half.

A female mold half 2 is schematically shown in FIG. 12-FIG. 14. As is conventional, female mold half 2 comprises a concave lens-forming surface 200, so that after mating male mold half 1 and female mold half 2 to form a closed lens mold 3, a cavity 201 is formed between the convex lens-forming surface 100 of male mold half 1 and concave lens-forming surface 200 of female mold half 2, with cavity 201 defining the shape of the contact lens to be formed. Only by way of example, concave lens-forming surface 200 of female mold half 2 is shaped such that the toric contact lens formed by the closed lens mold 3 comprises features that help to rotationally stabilize the contact lens on the astigmatic eye of a patient. For example, concave lens-forming surface 200 of female mold half 2 may be shaped such that the toric contact lens comprises prism ballast or slab-off portions. The embodiment of female mold half 2 further comprises an overflow channel 202 extending annularly around cavity 201, so that any excess lens-forming material that has been dosed into the concave lens-forming surface 200 of female mold half prior to mating the male and female mold halves may be displaced into overflow channel 202 when closing the mold 3. Female mold half 2 also comprises a tab 22, however, the shape of tab 22 is slightly different from that of male mold half 1 in that the free end of tab 22 is rounded.

Figures 1, 2, 3, 4, 5:
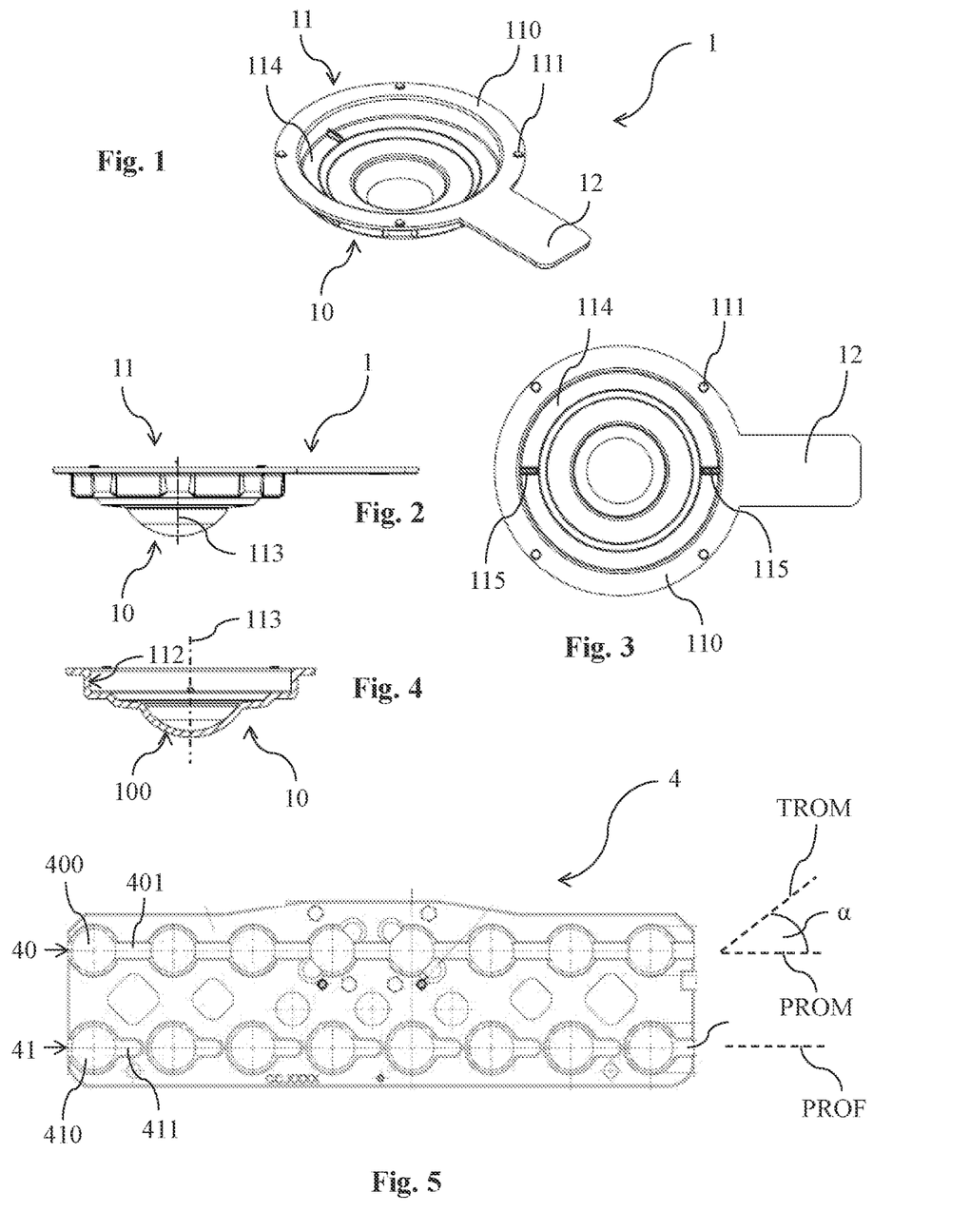
FIG. 1 is a perspective view of a male mold half for molding a toric contact lens.
FIG. 2 is a side view of the male mold half of FIG. 1.
FIG. 3 is a top view of the male mold half of FIG. 1.
FIG. 4 is a cross-sectional view of the male mold half of FIG. 1.
FIG. 5 is a top view of a carrier comprising two rows of openings, one for accommodating a plurality of the male mold halves shown in FIG. 1 and the other for accommodating the corresponding female mold halves.

FIG. 5 shows a carrier 4 that may be used for providing a plurality of male mold halves 1 of the type described above and a plurality of female mold halves 2 of the type described above. Carrier 4 comprises two rows 40 and 41, with a number of openings 400 and 410 as well as a number of grooves 401 and 411, being provided in the respective one of rows 40 and 41. Row 40 is provided for accommodating the male mold halves 1 while row 41 is provided for accommodating the female mold halves 2.

The male mold halves 1 and the female mold halves 2 are provided on carrier 4 having the same rotational orientation (the tabs 12 of the male mold halves 1 and the tabs 22 of the female mold halves 2 extend in the same direction, in FIG. 5 they all point horizontally to the right, see the orientation of the grooves 401 and 411). The rotational orientation of each female mold half 2 on carrier 4 is the predetermined rotational orientation PROF of the female mold half 2. In order for the male mold half 1 and the female mold half 2 to be properly mated to form the closed mold 3 with the male mold half 1 having the desired target rotational orientation TROM relative to the predetermined rotational orientation PROF of the female mold half 2 (see FIG. 13), it is necessary to rotate the respective male mold half 1 by a predetermined rotational angle α. As the predetermined rotational orientation PROM at which the male mold half 1 is provided on the carrier 4 is the same as the predetermined rotational orientation PROF of the female mold half 2 on the carrier 4, the male mold half 1 must be rotated by the predetermined angle α which is the difference between the predetermined rotational orientation PROF of the female mold half 2 and the target rotational orientation TROM of the male mold half 1 relative to the predetermined rotational orientation PROF of the female mold half 2 (see FIG. 13).

However, if the predetermined rotational orientation PROM at which the male mold half 1 is provided on carrier 4 is not the same as the predetermined rotational orientation PROF at which the female mold half 2 is provided on carrier 4, then the predetermined rotational angle by which the male mold half 1 must be rotated is different from the angle α. For example, let us assume that the tabs 12 of the male mold halves 1 arranged on carrier 4 all point to the left, then the rotational angle is 180°+α (counterclockwise rotation) or 180°−α (clockwise rotation).

The following discussion starts from the scenario shown in FIG. 5 in which the predetermined rotational orientation PROM of the male mold halves 1 and the predetermined rotational orientation PROF of the female mold halves 2 on the carrier are the same. Rotation of the male mold half 1 from the predetermined rotational orientation PROM by the predetermined rotational angle α to the target rotational orientation TROM may be performed with the aid of a gripper 5.

Figure 6:
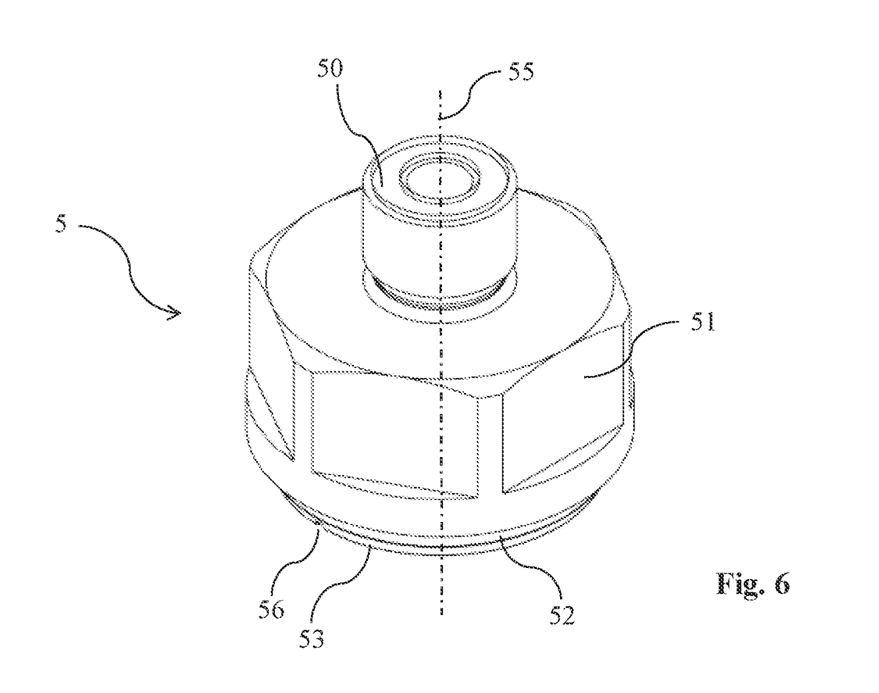
FIG. 6 is a perspective side view of a gripper for gripping a male mold half shown in FIG. 1 from the carrier shown in FIG. 5.
Figure 7:
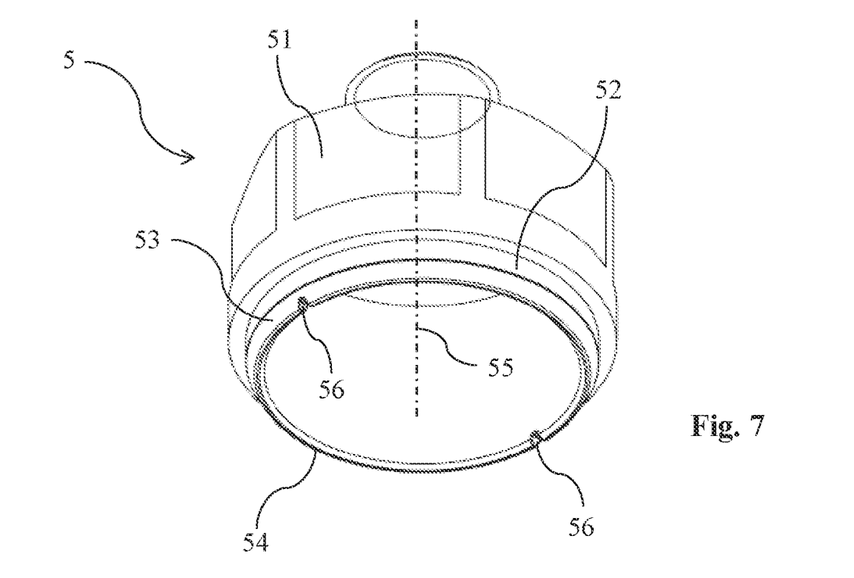
FIG. 7 is a perspective bottom view of the gripper of FIG. 6.

An embodiment of a gripper 5 for performing the said rotation is shown in FIG. 6 and FIG. 7. The embodiment of gripper 5 comprises a connector 50 arranged at its proximal end for being connected to a vacuum supply (not shown). In addition, gripper 5 comprises a hexagonal head portion 51 (having a shape similar to that of a hexagonal nut). Further downwards, gripper 5 comprises a cylindrical portion 52 followed by a centering portion 53 which is embodied as a conical portion (chamfer), that tapers towards the distal end face 54 of gripper 5. Distal end face 54 of gripper 5 extends in a plane perpendicular to a central axis 55 of gripper 5. Distal end face 54 comprises one or more pairs of recesses 56 being arranged therein. The individual recesses 56 of each pair of recesses 56 are arranged angularly spaced from one another by 180° (degrees) in a plane perpendicular to the central axis 55 of the gripper. While in the embodiment shown in FIG. 6 and FIG. 7 only one pair of recesses 56 is provided, it is possible for the gripper 5 to have more than one pair of recesses 56 arranged in the distal end face 54, with the individual recesses 56 of each pair being angularly spaced form one another by 180°, as explained above.

Figure 8:
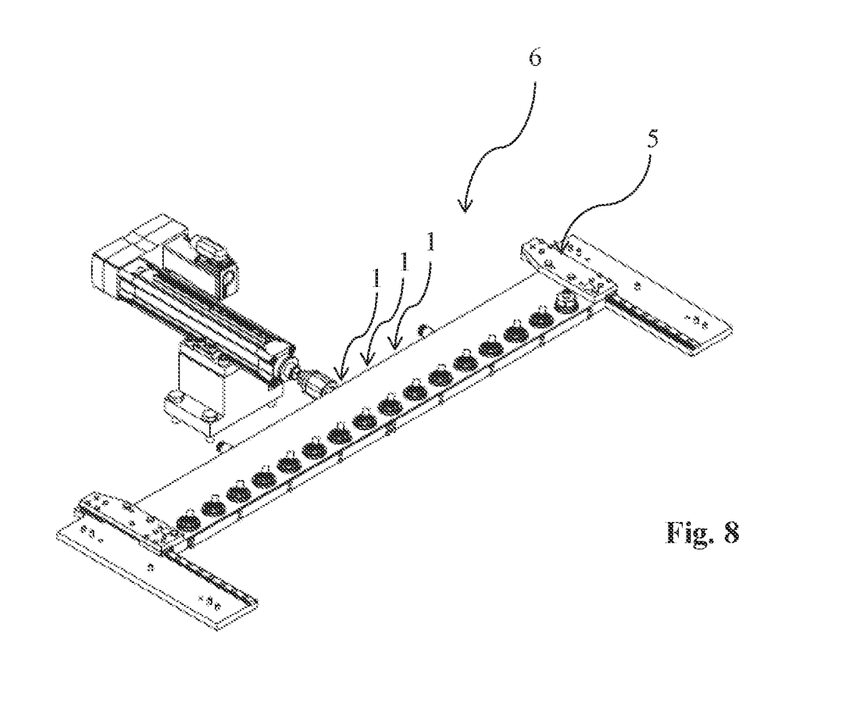
FIG. 8 is a perspective view of an intermediate storage carrier comprising a plurality of openings for accommodating the male mold halves shown in FIG. 1 rotated by a predetermined rotational angle.
Figure 9:
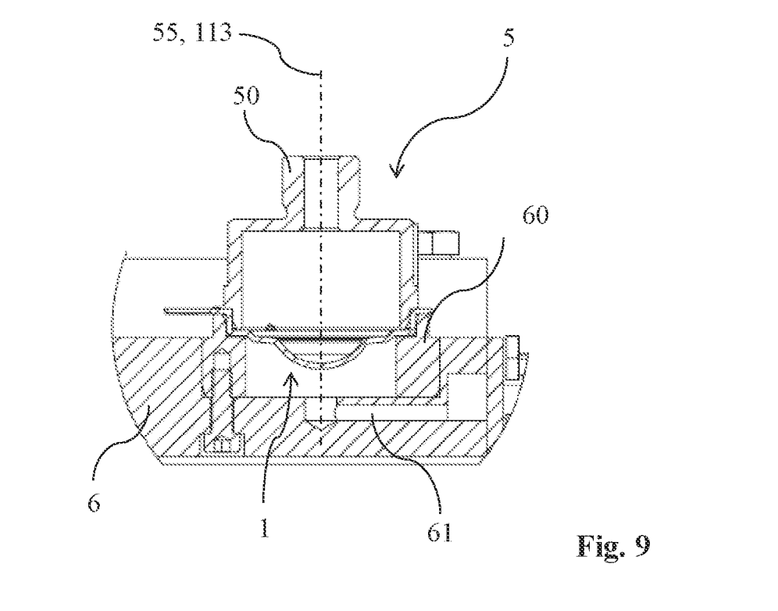
FIG. 9 is a cross-sectional view of a detail of FIG. 8 showing the situation where a male mold half shown in FIG. 5 and rotated by the predetermined angle is placed into an opening of the intermediate storage carrier with the aid of the gripper shown in FIG. 5.

Although FIG. 9 shows the situation at the time at which the (already rotated) male mold half 1 is placed on an intermediate storage carrier (shown in FIG. 8), the situation in which the male mold half 1 is picked up from carrier 4 can be understood when glancing at FIG. 9 and FIG. 1-FIG. 4.

For picking male mold half 1 up from carrier 4, gripper 5 is introduced into the cylindrical portion 112 of the rear face 11 of male mold half 1. At the time the centering portion 53 (conical portion, chamfer) engages the cylindrical portion 112 of the rear face 11 of male mold half 1, the gripper 5 is getting centered such that the central axis 55 of gripper 5 coincides with the central axis 113 of male mold half 1. Gripper 5 is then further introduced until the projections 115 arranged on the annular surface 114 on the rear face 11 of male mold half 1 enter into and engage with the recesses 56 provided in the distal end face 54 of gripper 5. Once the projections 115 are engaged with the recesses 56, gripper 5 and male mold half 1 are rotationally locked, i.e. a rotation of the male mold half 1 relative to gripper 5 is not possible anymore.

Introduction of the gripper 5 is continued until the distal end face 54 of gripper 5 abuts against the annular surface 114 on the rear face 11 of male mold half 1 (see FIG. 9). If not already done earlier, suction is now supplied through connector 50 thus making male mold half 1 adhere to gripper 5, and due to the centering action caused by the engagement of centering portion 53 (conical portion, chamfer) of gripper 5 and cylindrical portion 112 of the rear face 11 of male mold half 1, male mold half 1 adheres to gripper 5 in a centered manner, i.e. the central axis 55 of gripper 5 and the central axis 113 of male mold half 1 coincide.

Gripper 5 is then raised along its central axis 55 (with vacuum still being applied through connector 50), thus removing male mold half 1 from carrier 4. Thereafter, gripper 5 is rotated about its central axis 55 from the predetermined rotational orientation PROM by the predetermined rotational angle (here: α) so that after rotation by that predetermined rotational angle α the male mold half 1 adhered to the gripper 5 has the desired target rotational orientation TROM.

An intermediate storage carrier 6 shown in FIG. 8 may then be moved to a position below the raised gripper 5 (e.g. with the aid of a linear actuator), and the gripper 5 with the male mold half 1 being adhered thereto and having the desired target rotational orientation TROM is then lowered again. Intermediate storage carrier 6 may comprise a plurality of sleeve supports 60 onto which the male mold halves 1 can be placed, with the male mold halves 1 placed onto the sleeve supports having the desired target rotational orientation TROM. This situation when the male mold half 1 is placed onto a sleeve support 60 by the gripper 5 is schematically shown in FIG. 8 at the outermost right end of intermediate storage carrier 6, and is shown in FIG. 9 in an enlarged view. Upon placing the male mold half 1 having the desired target rotational orientation TROM onto sleeve support 60, application of suction through connector 50 at the proximal end of gripper 5 is discontinued while suction is applied through a supply channel 61 one end of which is connected to sleeve support 60, thus making male mold half 1 adhere to sleeve support 60.

While in FIG. 5 a carrier 4 is shown comprising eight male mold halves 1 and eight female mold halves 2, two such carriers 4 may be provided together so that in total sixteen male mold halves 1 and sixteen female mold halves 2 are concurrently provided. A corresponding number of sixteen grippers 5 may then be lowered and pick up the sixteen male mold halves 1 from the two carriers 4 as described, may subsequently be raised and rotate the sixteen male mold halves picked up from the predetermined rotational orientation PROM to the target rotational orientation TROM, and may thereafter place the sixteen male mold halves 1 having the target rotational orientation TROM onto the sixteen sleeve supports 60 provided by the intermediate storage carrier 6. The intermediate storage carrier 6 with sixteen male mold halves 1 arranged on the sleeve supports 60 is shown in FIG. 8.

To form contact lenses, the sixteen male mold halves 1 provided on the sleeve supports 60 of intermediate storage carrier 6 and having the desired target rotational orientation TROM must now be mated with the sixteen female mold halves 2 after a predetermined amount of lens-forming material has been dispensed (dosed) into each of the female mold halves 2. In the following, an embodiment is described how the male mold halves 1 provided on the sleeve supports 60 of the intermediate storage carrier 6 can be mated with the female mold halves 2 still arranged on the carrier 4. This is described for one male mold half 1 and one female mold half 2 only, but may be concurrently performed for all sixteen male mold halves 1 and female mold halves 2. Of course, when mating the male mold half 1 with the female mold half 2 the predetermined rotational orientation PROF of the female mold half 2 and the target rotational orientation TROM of the male mold half 1 relative to the predetermined rotational orientation PROF of female mold half must be maintained.

Figure 10:
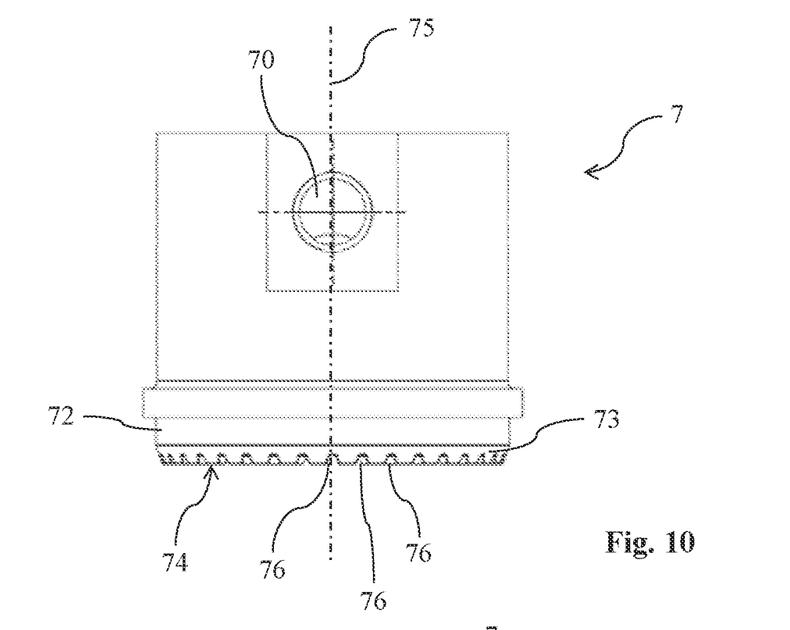
FIG. 10 is a front view of a capping stamp for mating the rotated male mold half with the corresponding female mold half.
Figure 11:
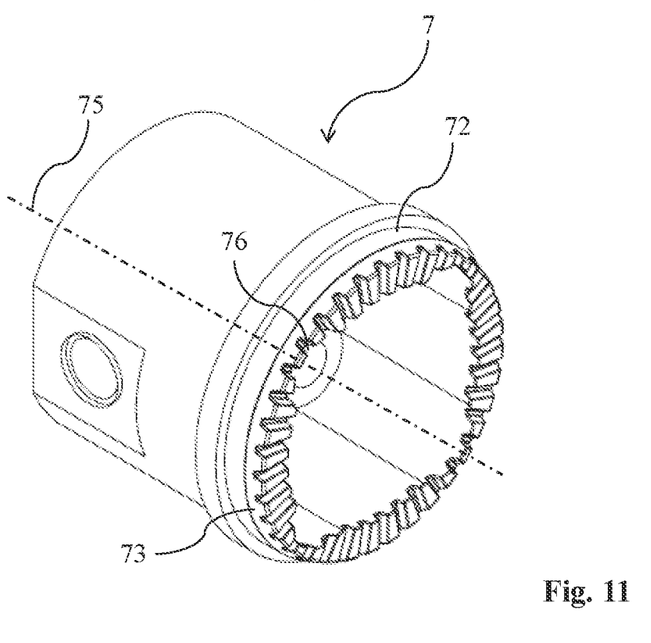
FIG. 11 is a perspective bottom view of the capping stamp of FIG. 10.

The male mold half 1 provided at the target rotational orientation TROM on the sleeve support 60 may be picked up with a capping stamp 7 shown in FIG. 10 and FIG. 11. Capping stamp 7 comprises a connector 70 to which suction can be applied. Connector 70 is provided in a flat portion of an otherwise cylindrical portion. Further downwards, capping stamp 7 comprises a cylindrical portion 72 followed by a centering portion 73 which is embodied as a conical portion (chamfer) that tapers towards a distal end face 74 of capping stamp 7. Distal end face 74 of capping stamp 7 extends in a plane perpendicular to a central axis 75 of capping stamp 7. Distal end face 74 comprises a plurality of pairs of recesses 76 being arranged therein. The individual recesses 76 of each pair of recesses 76 are arranged angularly spaced from one another by 180° (degrees) in a plane perpendicular to the central axis 75 of capping stamp 7. In the embodiment shown, eighteen such pairs of recesses 76 are arranged in circumferential direction, so that in total thirty-six recesses 76 are arranged in circumferential direction with adjacently arranged recesses 76 being angularly spaced by an angle of 10°.

Although FIG. 14 shows the situation at the time at which the male mold half 1 has already been mated with the female mold half 2, the situation in which the male mold half 1 is picked up from the sleeve support 60 of intermediate storage carrier 6 can be understood when glancing at FIG. 14 and FIG. 1-FIG. 4.

For picking male mold half 1 up from the sleeve support 60 of intermediate storage carrier 6 using capping stamp 7, capping stamp 7 is introduced into the cylindrical portion 112 of the rear face 11 of male mold half 1. At the time the centering portion 73 (conical portion, chamfer) engages the cylindrical portion 112 of the rear face 11 of male mold half 1, the capping stamp 7 is getting centered such that the central axis 75 of capping stamp 7 coincides with the central axis 113 of male mold half 1. Capping stamp 7 is then further introduced until the projections 115 arranged on the annular surface 114 on the rear face 11 of male mold half 1 enter into and engage with one pair of the recesses 76 provided in the distal end face 74 of capping stamp 7. Once the projections 115 are engaged with the recesses 76 (see FIG. 15 showing detail XV of FIG. 14), capping stamp 7 and male mold half 1 are rotationally locked, i.e. a rotation of the male mold half 1 relative to capping stamp 7 is not possible anymore.

Introduction of the capping stamp 7 is continued until the distal end face 74 of capping stamp 7 abuts against the annular surface 114 on the rear face 11 of male mold half 1 (see FIG. 14). If not already done earlier, suction is now supplied through connector 70 thus making male mold half 1 adhere to capping stamp 7, and due to the centering action caused by the engagement of centering portion 73 (conical portion, chamfer) of capping stamp 7 and cylindrical portion 112 of the rear face 11 of male mold half 1, male mold half 1 adheres to capping stamp 7 in a centered manner, i.e. the central axis 75 of capping stamp 7 and the central axis 113 of male mold half 1 coincide.

Capping stamp 7 then raised along its central axis 75 (with vacuum still being applied through connector 70), thus removing male mold half 1 from the intermediate storage carrier 6. Capping stamp 7 with male mold half 1 adhered thereto is then moved above the female mold half 2 arranged on carrier 4, with the lens-forming material having been dispensed into the female mold half 2. The target rotational orientation TROM of the male mold half 1 relative to the predetermined rotational orientation PROF of female mold half 2 is strictly maintained. A rigid support (now shown) may be arranged beneath carrier 4 to support female mold half 2 to counteract the force during mating the male mold half 1 with the female mold half 2 using capping stamp 7.

Capping stamp 7 with male mold half 1 adhered thereto is then lowered and presses the male mold half 1 into the female mold half 2, thereby displacing any excess lens-forming material into an annular overflow channel 202 surrounding the cavity 201 formed between the lens-forming surface 100 of male mold half 1 and lens-forming surface 200 of female mold half 2, see FIG. 14. Supply of suction through connector 70 of capping stamp 7 is discontinued during pressing the male mold half 1 into the female mold half 2. Since male mold half 1 and female mold half 2 are embodied in a self-centering manner, mating the male mold half 1 and the female mold half 2 to form a closed mold 3 results in male mold half 1 and female mold half 2 being perfectly centered relative to one another. Also, the desired target rotational orientation TROM of male mold half 1 relative to the predetermined rotational orientation PROF of female mold half 2 is perfectly met, see FIG. 12 and FIG. 13. Capping stamp 7 is then raised leaving the mold 3 in the closed state, so that the closed mold 3 can then be forwarded to the curing station where the lens-forming material is cured to form the toric contact lens. The major and minor axes of the thus formed toric contact lens are perfectly arranged at the desired rotational angle, so that the toric contact lens formed with the lens mold 3 can be stabilized on the eye of the patient exactly at the desired rotational orientation to perfectly correct the astigmatism.

As has been mentioned, the picking up of the male mold half 1 from the intermediate storage carrier 6 and mating with the female mold half 2 has been described for a single male mold half 1 and female mold half 2 only. However, it is evident that in case sixteen (or any other number) of male mold halves 1 are provided on the support sleeves 60 of intermediate storage carrier 6, these can be concurrently picked up by a corresponding number of capping stamps 7 and can be mated with a corresponding number of female mold halves 2 in order to improve the efficiency of the manufacturing process.

Embodiments of the invention have been described with the aid of the drawings. However, the invention is not limited to the embodiments described, but rather many changes and modifications are conceivable without departing from the teaching of the instant invention. Therefore, the scope of protections is defined by the appended claims.

The invention claimed is:

1. A method of providing a male mold half (1) for molding a toric ophthalmic lens at a predetermined target rotational orientation (TROM), the male mold half comprising a front face (10) having a toric convex lens-forming surface (100) and a rear face (11) opposite to the front face (10), the method comprising the steps of providing the male mold half (1) at a predetermined rotational orientation (PROM), picking the male mold half (1) up with a gripper (5) having a central axis (55), rotating the gripper (5) with the male mold half (1) about the central axis (55) of the gripper (5) by a predetermined rotational angle (α) towards the predetermined target rotational orientation (TROM), the predetermined rotational angle (α) being the angular difference between the predetermined rotational orientation (PROM) and the predetermined target rotational orientation (TROM), and releasing the rotated male mold half (1) from the gripper (5), wherein prior to picking the male mold half (1) up, centering the gripper (5) and the male mold half (1) relative to each other such that the central axis (55) of the gripper and a central axis (113) of the male mold (1) half coincide;

picking the male mold half (1) having the target rotational orientation (TROM) up with a capping stamp (7) having a central axis (75), and placing the male mold half (1) on a female mold half (2) to mate the male and female mold halves (1, 2) while keeping the target rotational orientation (TROM) of the male mold half (1) relative to a predetermined rotational orientation (PROF) of the female mold half (2) to form a closed lens mold (3), and prior to picking the male mold half (1) up with the capping stamp (7), centering the capping stamp (7) and the male mold half (1) relative to each other such that the central axis (75) of the capping stamp (7) and the central axis (113) of the male mold half (1) coincide.

2. A method according to claim 1, wherein centering the gripper (5) and the male mold half (1) relative to each other is performed by engaging a centering surface portion (53) of the gripper (5) with a centering surface portion (112) provided on the male mold half (1).

3. A method according to claim 2, wherein the centering surface portion (53) of the gripper (5) is a conical portion, in the form of a chamfer, tapering towards a distal end face (54) of the gripper (5).

4. A method according to claim 3, wherein the rear face (11) of the male mold half (1) includes a cylindrical portion extending in a direction coaxial with the central axis (113) of the male mold half (1) and forming the centering surface portion (112) thereof, and wherein the method further comprises introducing the gripper (5) into the cylindrical portion (112) on the rear face (11) of the male mold half (1) until the conical portion of the gripper (5) engages the cylindrical portion on the rear face (11) of the male mold half (1) thereby causing centration of the gripper (5) and the male mold half (1) relative to each other.

5. A method according to claim 4, wherein the rear face (11) of the male mold half (1) further comprises an annular surface (114) adjoining the cylindrical portion at a distal end of the cylindrical portion, the annular surface (114) extending radially inwardly in a plane perpendicular to the central axis (113) of the male mold half (1) and having at least one pair of projections (115) arranged thereon, the projections (115) of each pair of the at least one pair of projections (115) being arranged angularly spaced from one another by 180 degrees in the plane perpendicular to the central axis (113) of the male mold half (1), wherein the distal end face (54) of the gripper (5) extends in a plane perpendicular to the central axis (55) of the gripper (5), the distal end face (54) of the gripper (5) comprising at least one pair of recesses (56) arranged therein, the recesses (56) of each pair of the at least one pair of recesses (56) being arranged angularly spaced from one another by 180 degrees in the plane perpendicular to the central axis (55) of the gripper (5), and wherein the method further comprises introducing the gripper (5) into the cylindrical portion of the rear face (11) of the male mold half (1) until the recesses (56) of the at least one pair of recesses (56) arranged in the distal end face (54) of the gripper (5) engage with the projections (115) of the at least one pair of projections (115) arranged on the annular surface (114) of the rear face (11) of the male mold (1) half to rotationally lock the male mold half (1) and the gripper (5).

\* \* \* \* \*